United States Patent [19]

Trotman et al.

[11] 4,313,640

[45] Feb. 2, 1982

[54] COVERED BODY SUPPORTING AND SPACING STRUCTURE AND REMOVABLE COVER THEREFOR

[76] Inventors: Helen H. Trotman; Herbert H. Trotman, both of P.O. Box 807, Virginia Beach, Va. 23451

[21] Appl. No.: 149,306

[22] Filed: May 13, 1980

[51] Int. Cl.³ .............................................. A47C 7/02
[52] U.S. Cl. .................................................. 297/453
[58] Field of Search .................... 297/453, 452; 5/468, 5/481, 461, 347

[56] References Cited

U.S. PATENT DOCUMENTS

| | | | |
|---|---|---|---|
| 3,058,125 | 10/1962 | Zerbee | 5/347 |
| 3,063,753 | 11/1962 | Mitchell | 297/453 |
| 3,146,030 | 8/1964 | Dennison et al. | 297/453 |
| 3,162,487 | 12/1964 | Trotman | 297/453 |
| 3,162,488 | 12/1968 | Trotman | 297/453 |
| 3,391,413 | 7/1968 | Crane et al. | 5/347 |
| 3,514,156 | 5/1970 | Fields | 297/453 |
| 3,940,183 | 2/1976 | Seltzer et al. | 297/453 |

*Primary Examiner*—Doris L. Troutman

*Attorney, Agent, or Firm*—Shanley, O'Neil and Baker

[57] ABSTRACT

A covered body support member for spacing a body above a supporting structure which comprises a sheet of resilient plastic material permanently deformed to produce downwardly disposed, laterally spaced, protuberances distributed over a body support area for engaging the supporting surface, adjacent protuberances being complementary in shape and disposed in overlapping relation to each other, whereby the body support area of the member will resist flexing along any straight line traversing the body support area. An attachable and detachable cover member formed of readily flexible material extends over the body support area of the body support member and is held in place on the body support member by the provision of pockets formed in the cover material, the pockets snugly receiving end portions of the sheet of resilient plastic material. The cover material is readily applied to or removed from the body support member by slight flexure of the sheet of resilient plastic material. The cover member may embody or enclose a cushioning member.

6 Claims, 3 Drawing Figures

U.S. Patent     Feb. 2, 1982     4,313,640 a COVERED BODY SUPPORTING AND SPACING STRUCTURE AND REMOVABLE COVER THEREFOR

BACKGROUND OF THE INVENTION

In recent years, a novel form of ventilated seat cushion to be used in conjunction with automobile seat cushions has been proposed, this form of ventilated seat cushion comprising an economical single sheet member formed from resilient plastic which will support a body in spaced relation to a supporting structure, such as an automobile seat, to thereby provide ventilation between the body supported and the automobile seat cushion. Such members are formed from a single sheet of plastic which is permanently deformed to produce spacing elements or protuberances that not only will space the upper surface of the member above the supporting structure for ventilation but will resiliently rigidify the overall member so as to prevent an undesirable amount of flexing in use.

Examples of these body supporting structures are disclosed in U.S. Pat. No. 4,143,916 and in applicants' copending application Ser. No. 16,401 filed Mar. 1, 1979.

By ingenious relationships of protuberances formed by permanent deformation of a sheet of plastic material in the body supporting and spacing structures in U.S. Pat. No. 4,143,916 and applicants' copending application Ser. No. 16,401, the sheet of plastic material is resilient in the realm of the forces exerted by the weight of a human body. The formed sheet of plastic material of these inventions can be used as a member which is rigid enough to retain its shape while at the same time exhibiting a springy characteristic so as to act as a cushion between a human body and a supporting structure. This is especially the case where the sheet of plastic material is superposed on an automobile seat cushion to achieve ventilation between the person supported on the sheet of plastic material and the automobile seat.

Although body supporting and spacing structures such as disclosed in U.S. Pat. No. 4,143,916 and applicants' copending application Ser. No. 16,401 can be and are used without covering material, ornamental and/or cushioning covering material makes these products more attractive and desirable in use. Although it is practical to permanently attach ornamental and/or cushioning material to these body-supporting and spacing structures, for example, as disclosed in applicants' copending application Ser. No. 121,169 filed Feb. 13, 1980, it is much more desirable from the marketing viewpoint to have the covers attachable to and detachable from the body supporting and spacing structure. By this means, a merchant can have in stock a large number of the body supporting and spacing structures, which incidentally are nestable and therefore occupy small space in his establishment, and he can also have in stock many attachable and detachable covers of different color, ornamental appearance and price range, the last especially in respect to supplemental cushioning combined with the covering material to form a cushioned cover. Each customer selects the cover he desires and the selected cover is then applied to a purchased body-supporting and spacing structure. By the same token, the merchant can exhibit numerous different covers on part of his stock of body-supporting and spacing structures so as to present to prospective customers the several ornamental and cushioning covers in situ for selection by the customers. An additional advantage of the present invention is that the cover being cheaper than the body support member, the cover can be disposed of and replaced by a new cover of the same or different motif when the original cover becomes worn or soiled.

SUMMARY OF THE INVENTION

The present invention involves the combination of a supporting spacing member for use between a supporting surface and a body to be supported and an attachable and detachable cover member for the supporting spacing member formed of readily flexible material, wherein the supporting spacing member is formed from a sheet or resilient plastic material which is permanently deformed to provide contiguous protuberances distributed over a body support area for engaging the supporting surface, adjacent protuberances being complementary in shape and disposed in overlapping relation to each other whereby the body support area of the member will resist flexing along lines traversing the body support area, the supporting spacing member having peripheral marginal portions, an end portion and two end corner portions, the cover member comprising a front panel for surface contact with the body to be supported corresponding generally in shape to the supporting spacing member and having peripheral marginal portions, an end portion and two end corner portions coinciding with peripheral marginal portions, the end portion and two end corner portions respectively of the supporting spacing member, a rear panel having peripheral marginal portions connected along one end marginal portion thereof to one end marginal portion and to opposite side marginal portions of the front panel to form a pocket receiving in snug fitting relation one end portion of the supporting spacing member, and a pair of spaced rear corner panels each having a peripheral marginal portion, each corner panel being connected along a marginal portion to a different end corner portion of the front panel to form two separate corner pockets, each corner pocket being dimensioned to receive in snug fitting relation a different end corner of a supporting spacing member, the protuberances on the supporting spacing member coacting with one another to stiffen the supporting spacing member against excessive deflection in use as a supporting spacing member while accommodating limited flexure of the supporting spacing member during application and removal of the cover member.

The present invention also involves an attachable and detachable cover member, formed of readily flexible material, for a supporting spacing member designed for use between a supporting surface and a body to be supported, the supporting spacing member being formed from a sheet of resilient plastic material which is permanently deformed to provide contiguous protuberances which coact to stiffen the supporting spacing member against excessive deflection in use as a supporting spacing member while accommodating limited flexure during application and removal of a cover member, the supporting spacing member having peripheral marginal portions, an end portion and two end corner portions, the cover member comprising a front panel for surface contact with the body to be supported corresponding generally in shape to the supporting spacing member and having peripheral marginal portions, an end portion and two end corner portions, dimensioned to coincide with the peripheral marginal portions, end portion and two end corner portions respectively of the supporting spacing member when a cover member is in place on a supporting spacing member, a rear panel having peripheral marginal portions connected along one end marginal portion thereof to one end marginal portion and to opposite side marginal portions of the front panel to form a pocket dimensioned to receive in snug fitting relation one end portion of a supporting spacing member when a cover member is in place on the supporting spacing member, a pair of spaced rear corner panels each having a peripheral marginal portion, each corner panel being connected along a marginal portion to a different end corner portion of the front panel to form two separated pockets, each pocket dimensioned to receive snugly a different end corner of a supporting spacing member when a cover member is in place on the supporting spacing member.

DETAILED DESCRIPTION OF THE INVENTION

Figure 1:
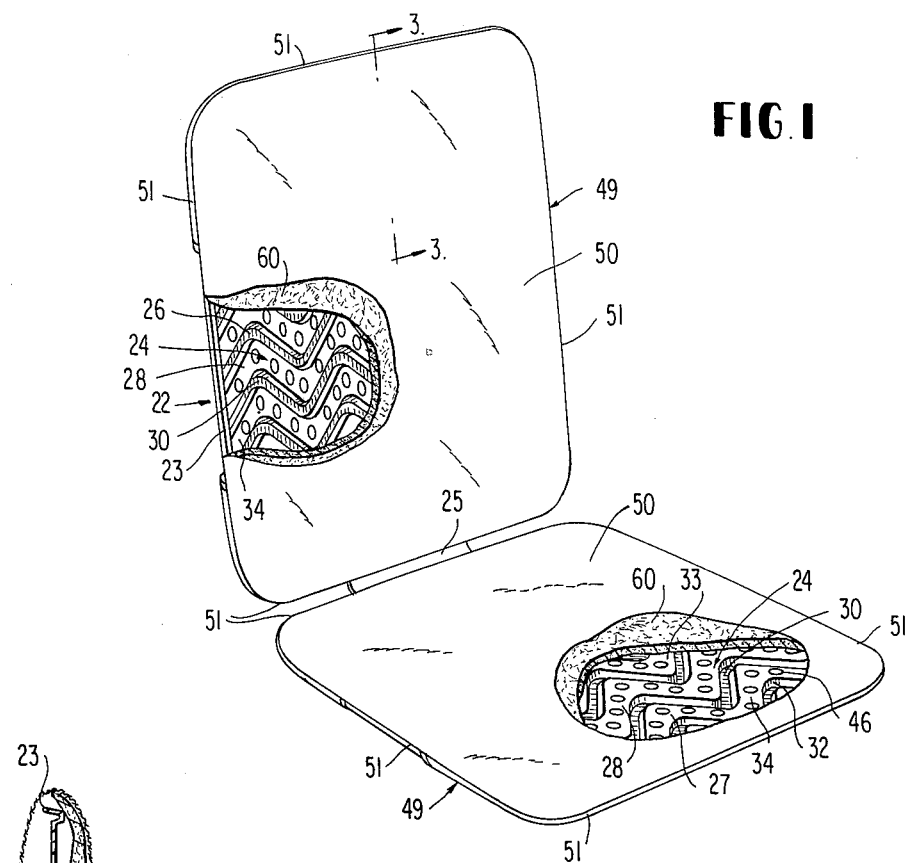
FIG. 1 is a front perspective view of the covered body supporting and spacing structure of the present invention.
Figure 3:
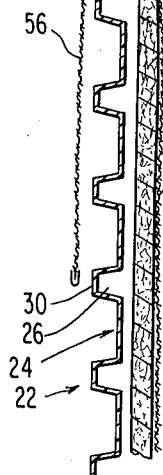
FIG. 3 is a view in vertical section taken on the line 3—3 of FIG. 1.

As already mentioned, the supporting spacing member suitable for use in connection with the present invention can be any semi-rigid or slightly flexible cushion member, for example, such as those illustrated in U.S. Pat. No. 4,143,916 or copending patent application Ser. No. 16,401 filed Mar. 1, 1979. For purposes of illustration of the present invention, a supporting spacing member of the latter type is illustrated and will be described but without limitation in the appended claims as to the form of protuberances relied upon to rigidify the cushion.

The car seat cushion illustrated is made up of a seat member indicated generally by the reference numeral 20 and a back member indicated generally by the reference number 22, each member having an ornamental bead or marginal portion 23 circumscribing a body support area indicated generally at 24, 24. Normally the seat member and the back member will be formed integrally from the same material, namely, a thin sheet of resilient plastic which can be heat formed in a vacuum or pressure mold to give a desired permanent, three dimensional configuration to the sheet. An integral extension or hinge section 25 joins the seat and back portions.

Figure 2:
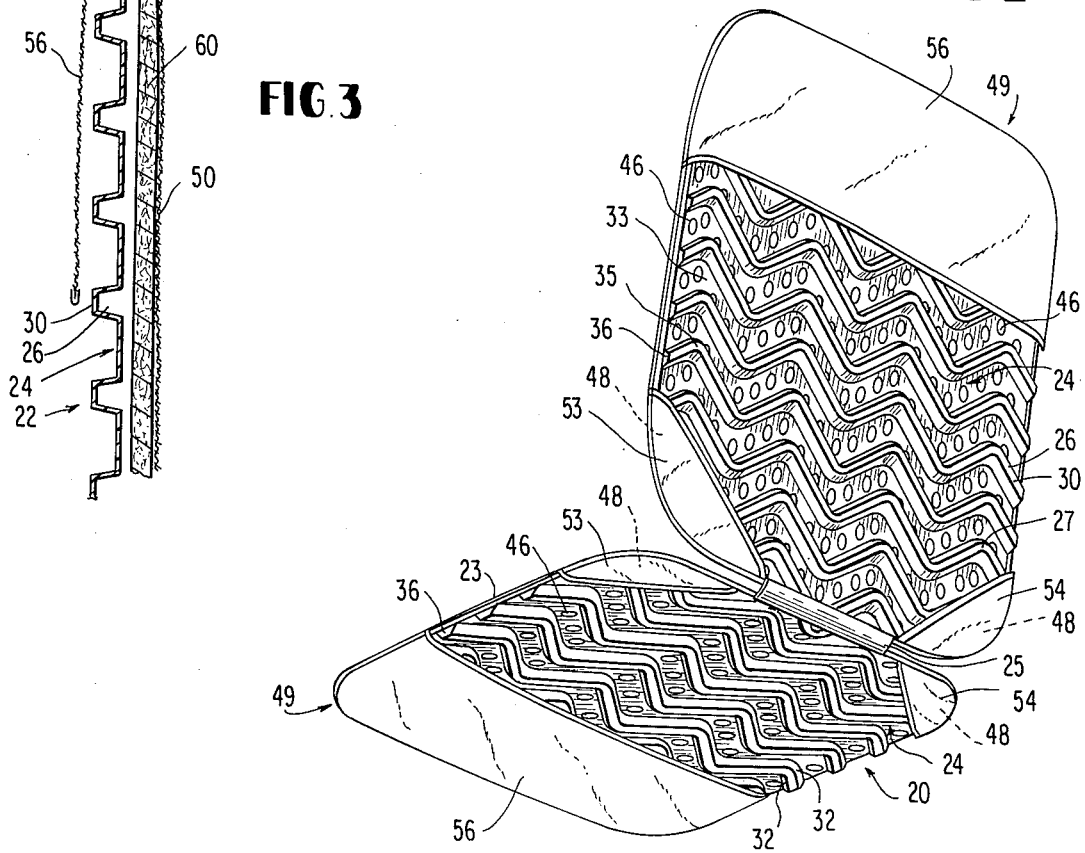
FIG. 2 is a rear perspective view of the back and bottom of the covered body supporting and spacing structure of FIG. 1.

Since the body support areas 24, 24 can have the same configuration in the seat member and the back member and are so shown in FIGS. 1 and 2, specific reference is made at this point only to the seat member.

In the presently preferred embodiment of the present invention, a plurality of elongated protuberances 26 are formed in a flat sheet of plastic material in a vacuum mold in the inverse position of seat member 20 as shown in FIG. 1 so that as the sheet is formed in the mold, the protuberances are directed upwardly. However, for convenience in describing the present invention and without limitation in respect to what is top and what is bottom in the various modifications shown, described and covered by the appended claims, the surface of the seat member which appears uppermost in FIG. 1, will be termed the top surface of the sheet and the opposite side of the sheet illustrated in FIG. 2 will be termed the bottom surface. Thus, in the seat member 20 of these figures, the elongated protuberances 26 depend downwardly and are open upwardly.

In view of the nature of the plastic sheet and the method of manufacture of the seat and back member it will be seen that the car seat cushion and its components are nestable and therefore stackable for storage and shipment. This constitutes a tremendous commercial advantage.

Elongated protuberances 26 extend continuously across an entire dimension of the body support area from marginal portion 23 on one side of the seat member to marginal portion 23 on the other side of the seat member, periodically changing direction along their length. Inspection of FIG. 1 shows that in this presently preferred embodiment the plurality of elongated protuberances 26, although incorporating curved direction changing portions 27 and portions 28 connecting the direction changing portions 27, nevertheless extend side by side in generally parallel paths between the opposite marginal portions 23 of the seat member. Of course, the general direction of the parallel paths of elongated protuberances 26 could be across other dimensions of the body support area, such as from the front of the seat to the back or diagonally of the seat member without departing from the principles of the invention.

Each elongated protuberance 26 has a bottom wall 30 and sidewalls 32, 32. The upper surface of the sheet of plastic material forming the seat member is formed in contact with the surfaces of the mold as the hot plastic is drawn or forced down into depressions in the mold and this bottom surface in the mold becomes the upper surface in the finished seat member. The surface portions 34 of this top surface of the sheet of plastic material made up of the portions of the sheet which extend between the open tops of protuberances 26 constitute in the aggregate a body engaging structure 33 of the seat and preferably, but not necessarily, this structure is flat to form a comfortable surface for contact with the body of the person using the seat. It is also preferable for comfort in respect to the body engaging structure that the area of plastic sheet between the open tops of the protuberances be as large as possible, consistent with requisite strength in the elongated protuberances and therefore the area of the body engaging structure 33 can, as shown, constitute more than one-half the area of the body support area, which latter area of course includes the open tops of the elongated protuberances. On the other hand at the sacrifice of some comfort aspects, the aggregate area of surfaces 34 may be less than one-half the body support area 24. Of course, surfaces 34 can vary in size and shape in the same body support 24.

Each elongated protuberance 26 terminates at its ends in a slightly slanting endwall 36 integrally joined to the sidewalls 32, 32 and bottom wall 30 of the elongated protuberance and preferably to the sheet portion entering marginal portion 23. This construction rigidifies the elongated protuberances at their ends.

It will be evident from an inspection of the preferred form of seat member 20 that the direction changing portions 27 and portions 28 connecting the direction changing portions 27 of adjacent or side by side elongated protuberances generally follow each other along the parallel paths of the protuberances across the seat so as to result in the opposed sides of side by side elongated protuberances being complementary in shape or generally complementary in shape in the plane of body support area 33 and the term complementary as used in this specification is intended to embrace a complementary relationship in respect to only the opposed sides of protuberances.

It will further be evident that the seat member 20 can be used along with or without the back member 22, as a seat cushion in any environment, such as on a stadium bench, on the ground in a picnic, beside a swimming pool or in any other environment where the spacing and cushioning effect are desired.

The elongated protuberances 26 with their open tops have a ventilating function because air movement occurs along their length dimension; however, where a greater ventilating action in the seat is desirable, a plurality of ventilating holes 46 are punched through the sheet, preferably in the flat body engaging structure 33, i.e., in the sheet surface portions 34 between the open tops of the elongated protuberances. Ventilating holes can be punched in other places where desired so long as the structural characteristics of the elongated protuberances are not lessened.

The integral hinge 25 is in the form of an extension integral with each of members 20 and 22. The width of extension or hinge 25 from side to side is appreciably less than the width of the seat member 20 or the back member 22. This is important in that it leaves projecting corner portions 48, 48 on the member and it also allows the seat and back members to curve or flex slightly across their width dimension without causing an objectionable flexure in the hinge at right angles to the hinging action.

The principle which is fundamental to the applicants' form of protuberance is that, despite the fact that the body engaging structure 33 can or need not occupy more than one-half the area of the body support area 23, in every case the direction changing portions of the elongated protuberances in the adjacent or side by side protuberances must overlap each other looking in the direction of the length of the elongated protuberances or in other words in the direction of the generally parallel paths the side by side elongated protuberances follow. From this structure follows the advantage that there is no line of weakness in respect to flexure in any direction throughout body support area 23 of seat member 20 or back member 22.

The removable cover of the present invention is formed from any suitable readily flexible material such, for example, as fabric, leather, synthetic leather or woven fiber. Suitable fabrics are woolen, cotton and synthetic fiber cloths, corduroy, artificial fur and quilted cloth materials. Where cushioning means are combined with the cover, the cushioning means can be a separate cushioning means such as randomly disposed synthetic fibers built up to form a cushioning pad of about ¼ to about ¾ inches in thickness. The cushioning pad can be formed of foamed rubber or foamed synthetic rubbery material.

Referring to the drawing, since the cover, indicated generally at 49, for the seat and the back are of similar construction although different dimensions, the cover for the seat portion only will be described. This cover comprises a front panel 50 having marginal portions 51 extending around the entire periphery. At the end of front panel 50 which is contiguous to hinge 25 with the cover on a supporting spacing member, a pair of spaced rear corner panels 53 and 54 are connected to panel 50 along the marginal portions thereof to thereby form corner pockets each shaped to receive snugly one of the two end corners of the supporting spacing member. At the end of supporting spacing member 20 remote from hinge 25 a single rear panel 56 is connected along the marginal portions of panel 50.

Since the peripheral outline of cover member 49 corresponds to the peripheral outline of supporting spacing member 20 and the opening defined by the inner marginal portions of panels 53, 54 and 56 define an opening considerably smaller than any dimension of supporting spacing member 20, cover member 49 is applied to supporting spacing member 20 by slipping supporting spacing member 20 into the large pocket formed by front panel 50 and rear panel 56 followed by slight flexure of supporting spacing member 20 to accommodate the reception of the end corner portions of spacing member 20 within the pockets formed by rear corner panels 53 and 54. Supporting spacing member 20 being formed of resilient plastic material returns to its original flat shape thereby exerting resilient tightening force on panel 50.

Where desired, a cushioning material 60 can be used between panel 50 and supporting spacing member 20 with cushioning member 60 being held in place by the tension applied to cover 50 or by any suitable attaching means between cushioning pads 60 and the underside of front panel 50.

As has been described, each section 20 and 22 has an end corner portion on each side of extension or hinge 25 and a single end portion remote from hinge 25. It will be evident from the foregoing description that the corner end portions are an important structural feature of the present invention. The single end portion can be semicircular without affecting the functional aspects of the present invention.

Where seat 20 alone is provided in this product so as to form a portable cushion, for use on the ground for instance, extension 25 can serve as a carrying handle.

The foregoing description in respect to seat member 20 is equally applicable to back member 22 and the same reference numerals are used in respect to the back member 22.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

We claim:

1. The combination of a supporting spacing member for use between a supporting surface and a body to be supported and an attachable and detachable cover member for the supporting spacing member formed of readily flexible material, wherein the supporting spacing member is formed from a sheet of resilient plastic material which is permanently deformed to provide contiguous protuberances distributed over a body support area for engaging the supporting surface, adjacent protuberances being complementary in shape and disposed in overlapping relation to each other whereby the body support area of the member will resist flexing along lines traversing the body support area, the supporting spacing member having peripheral marginal portions, an end portion and two end corner portions, the cover member comprising a front panel for surface contact with the body to be supported corresponding generally in shape to the supporting spacing member and having peripheral marginal portions, an end portion and two end corner portions coinciding with peripheral marginal portions, the end portion and two end corner portions respectively of the supporting spacing member, a rear panel having peripheral marginal portions connected along one end marginal portion thereof to one end marginal portion and to opposite side marginal portions of the front panel to form a pocket receiving in snug fitting relation one end portion of the supporting spacing member, and a pair of spaced rear corner panels each having a peripheral marginal portion, each corner panel being connected along a marginal portion to a different end corner portion of the front panel to form two separate corner pockets, each corner pocket being dimensioned to receive in snug fitting relation a different end corner of a supporting spacing member, the protuberances on the supporting spacing member coacting with one another to stiffen the supporting spacing member against excessive deflection in use as a supporting spacing member while accommodating limited flexure of the supporting spacing member during application and removal of the cover member.

2. The combination of claim 1 wherein the dimensions of the supporting spacing member and the cover are such that the cover member front panel is held taut by the resilience of the supporting spacing member and the coaction of the pockets.

3. The combination of claim 1 or 2 wherein the supporting spacing member includes an extension projecting from one peripheral marginal portion between the two end corner portions, the extension having a width dimension measured along the one peripheral marginal portion appreciably less than the length dimension of the one peripheral marginal portion, the extension stopping short of each corner portion.

4. The combination of claim 1 wherein there is a second supporting spacing member similar to the first claimed supporting spacing member, and a flexible hinge member joins the two supporting spacing members to accommodate relative pivotal movement of the two supporting spacing members along the width dimension of the hinge member, the width of the hinge member being appreciably less than the distance between the two end corner portions of the supporting spacing member, the flexible hinge member being connected to each supporting spacing member intermediate the two corner end portions whereby the hinge member does not interfere with reception of the end corners of the supporting spacing member by the corner cover pockets.

5. An attachable and detachable cover member, formed of readily flexible material, for a supporting spacing member designed for use between a supporting surface and a body to be supported, the supporting spacing member being formed from a sheet of resilient plastic material which is permanently deformed to provide contiguous protuberances which coact to stiffen the supporting spacing member against excessive deflection in use as a supporting spacing member while accommodating limited flexure during application and removal of a cover member, the supporting spacing member having peripheral marginal portions, an end portion and two end corner portions, the cover member comprising a front panel for surface contact with the body to be supported corresponding generally in shape to the supporting spacing member and having peripheral marginal portions, an end portion and two end corner portions, dimensioned to coincide with the peripheral marginal portions, end portion and two end corner portions respectively of the supporting spacing member when a cover member is in place on a supporting spacing member, a rear panel having peripheral marginal portions connected along one end marginal portion thereof to one end marginal portion and to opposite side marginal portions of the front panel to form a pocket dimensioned to receive in snug fitting relation one end portion of a supporting spacing member when a cover member is in place on the supporting spacing member, a pair of spaced rear corner panels each having a peripheral marginal portion, each corner panel being connected along a marginal portion to a different end corner portion of the front panel to form two separated pockets, each pocket dimensioned to receive snugly a different end corner of a supporting spacing member when a cover member is in place on the supporting spacing member.

6. The cover member of claim 5 wherein the dimensions of the cover member are such that the front panel of the cover member is held taut by the resilience of the supporting spacing member and the coaction of the cover corner pockets when a cover member is in place on a supporting spacing member.

* * * * *